United States Patent
Park et al.

(10) Patent No.: US 11,405,942 B2
(45) Date of Patent: Aug. 2, 2022

(54) METHOD AND APPARATUS FOR TRANSMITTING AND RECEIVING DOWNLINK SIGNAL IN NEXT GENERATION WIRELESS NETWORK

(71) Applicant: KT CORPORATION, Gyeonggi-do (KR)

(72) Inventors: Kyujin Park, Seoul (KR); Woo-jin Choi, Seoul (KR)

(73) Assignee: KT CORPORATION, Gyeonggi-do (KR)

( * ) Notice: Subject to any disclaimer, the term of this patent is extended or adjusted under 35 U.S.C. 154(b) by 100 days.

(21) Appl. No.: 16/349,874

(22) PCT Filed: Nov. 16, 2017

(86) PCT No.: PCT/KR2017/012992
§ 371 (c)(1),
(2) Date: May 14, 2019

(87) PCT Pub. No.: WO2018/093162
PCT Pub. Date: May 24, 2018

(65) Prior Publication Data
US 2019/0274153 A1   Sep. 5, 2019

(30) Foreign Application Priority Data

Nov. 16, 2016  (KR) .................. 10-2016-0152659
Nov. 15, 2017  (KR) .................. 10-2017-0151983

(51) Int. Cl.
*H04W 72/12*   (2009.01)
*H04L 5/00*   (2006.01)
(Continued)

(52) U.S. Cl.
CPC ....... *H04W 72/1257* (2013.01); *H04L 5/0007* (2013.01); *H04L 5/0044* (2013.01);
(Continued)

(58) Field of Classification Search
None
See application file for complete search history.

(56) References Cited

U.S. PATENT DOCUMENTS

2006/0007880 A1  1/2006  Terry
2008/0068979 A1  3/2008  Visotsky et al.
(Continued)

OTHER PUBLICATIONS

Intel Corporation, "Downlink URLLC transmission and multiplexing with eMBB", R1-1612003, 3GPP TSG RAN WG1 Meeting #87, Reno, USA, Nov. 14-18, 2016, pp. 1-9.
(Continued)

*Primary Examiner* — Faruk Hamza
*Assistant Examiner* — Cassandra L Decker
(74) *Attorney, Agent, or Firm* — Invenstone Patent, LLC

(57) ABSTRACT

Provided are a method and apparatus for transmitting and receiving a downlink signal for supporting effective multiplexing between data traffic having mutually different QoS requirements in a next generation/5G wireless access network ("New Radio" (NR)) for which discussion has begun in 3GPP. The method may include receiving configuration information for receiving downlink pre-emption indication data from a base station; monitoring the downlink pre-emption indication data based on the configuration information; and receiving the downlink pre-emption indication data through a multicast or unicast signal, wherein the downlink pre-emption indication data indicates superposed radio resources for providing a first service and for providing a second service.

12 Claims, 8 Drawing Sheets

(51) Int. Cl.
*H04W 24/08* (2009.01)
*H04W 72/04* (2009.01)
*H04W 76/27* (2018.01)

(52) U.S. Cl.
CPC .......... *H04L 5/0053* (2013.01); *H04L 5/0094* (2013.01); *H04W 24/08* (2013.01); *H04W 72/042* (2013.01); *H04W 72/1273* (2013.01); *H04W 76/27* (2018.02); *H04W 72/1289* (2013.01)

(56) References Cited

U.S. PATENT DOCUMENTS

| | | | |
|---|---|---|---|
| 2010/0208689 | A1 | 8/2010 | Terry |
| 2010/0323709 | A1* | 12/2010 | Nam .................. H04L 5/0023 455/450 |
| 2012/0176957 | A1* | 7/2012 | Chen .................. H04B 7/155 370/315 |
| 2013/0272243 | A1 | 10/2013 | Terry |
| 2014/0086112 | A1* | 3/2014 | Stern-Berkowitz .................. H04L 1/1822 370/280 |
| 2015/0358111 | A1* | 12/2015 | Marinier ............ H04L 27/0008 370/329 |
| 2016/0037517 | A1 | 2/2016 | Terry |
| 2016/0066345 | A1* | 3/2016 | Sun .................. H04J 11/004 370/329 |
| 2016/0113008 | A1 | 4/2016 | Damnjanovic et al. |
| 2016/0218849 | A1 | 7/2016 | Bertrand et al. |
| 2017/0367070 | A1* | 12/2017 | Zhang ............... H04W 52/0238 |
| 2018/0019852 | A1* | 1/2018 | Soldati .................. H04L 5/0053 |
| 2018/0020441 | A1* | 1/2018 | Lo ...................... H04W 72/044 |
| 2018/0027493 | A1* | 1/2018 | Li .................... H04W 52/0216 370/280 |
| 2018/0035332 | A1* | 2/2018 | Agiwal ............ H04W 74/0858 |
| 2018/0070341 | A1* | 3/2018 | Islam .................... H04L 1/1887 |
| 2019/0021085 | A1* | 1/2019 | Mochizuki ........ H04W 72/0446 |
| 2019/0090239 | A1 | 3/2019 | Damnjanovic et al. |
| 2019/0116007 | A1* | 4/2019 | Yi ....................... H04L 27/2607 |
| 2019/0200235 | A1* | 6/2019 | Lyu ....................... H04L 5/0094 |
| 2019/0281609 | A1* | 9/2019 | Kowalski .......... H04W 72/1242 |
| 2020/0037297 | A1* | 1/2020 | Pan .................... H04W 56/001 |
| 2021/0288705 | A1* | 9/2021 | Lee .................... H04B 7/0626 |

OTHER PUBLICATIONS

Ericsson, "Summary of e-mail discussions on downlink control signaling", R1-1612908, TSG-RAN WG1 #87, Reno, NV, USA, Nov. 14-18, 2016.

Nokia et al., "Basic grant-free transmission procedure for URLLC", R1-1612250, 3GPP TSG-RAN WG1 #87, Reno, USA, Nov. 14-18, 2016.

Fujitsu, "DL control channel related to multiplexing eMBB and URLLC", R1-1611465, 3GPP TSG RAN WG1 Meeting #87, Reno, USA, Nov. 14-18, 2016, pp. 1-4.

Catt, "NR frame structure for multiplexing of URLLC and eMBB traffic", R1-1611367, 3GPP TSG RAN WG1 Meeting #87, Reno, NV, USA, Nov. 14-18, 2016, pp. 1-4.

Etri, "Multiplexing of eMBB and URLLC transmissions", R1-1609392, 3GPP TSG RAN WG1 Meeting #86bis, Lisbon, Portugal, Oct. 10-14, 2016, pp. 1-3.

Samsung, "Multiplexing URLLC and eMBB in DL", R1-1609059, 3GPP TSG RAN WG1 Meeting #86bis, Lisbon, Portugal, Oct. 10-14, 2016, pp. 1-5.

Samsung, "Evaluation results of superposition scheme in case of multiplexing eMBB and URLLC", R1-1609058, 3GPP TSG RAN WG1 Meeting #86bis, Lisbon, Portugal, Oct. 10-14, 2016.

Fujitsu, "DL control channel related to multiplexing eMBB and URLLC", R1-1608814, 3GPP TSG RAN WG1 Meeting #86bis, Lisbon, Portugal Oct. 10-14, 2016, pp. 1-4.

* cited by examiner

METHOD AND APPARATUS FOR TRANSMITTING AND RECEIVING DOWNLINK SIGNAL IN NEXT GENERATION WIRELESS NETWORK

CROSS REFERENCE TO RELATED APPLICATIONS

This application is a National Stage Patent Application of PCT International Patent Application No. PCT/KR2017/012992 (filed on Nov. 16, 2017) under 35 U.S.C. § 371, which claims priority to Korean Patent Application Nos. 10-2016-0152659 (filed on Nov. 16, 2016) and 10-2017-0151983 (filed on Nov. 15, 2017), the teachings of which are incorporated herein in their entireties by reference.

TECHNICAL FIELD

The present invention relates to a method and an apparatus for transmitting and receiving a downlink signal for supporting efficient multiplexing between data traffics each having different QoS requirements from another in a next generation/5G wireless access network ("New Radio" (NR)) that is under discussion in the 3rd generation partnership project (3GPP).

BACKGROUND ART

Recently, the 3GPP has approved the "Study on New Radio Access Technology", which is a study item for research on next-generation/5G radio access technology. On the basis of the Study on New Radio Access Technology, Radio Access Network Working Group 1 (RAN WG1) has been discussing frame structures, channel coding and modulation, waveforms, multiple access methods, and the like for the new radio (NR). It is required to design the NR not only to provide an improved data transmission rate as compared with the long term evolution (LTE)/LTE-Advanced, but also to meet various requirements in detailed and specific usage scenarios.

An enhanced mobile broadband (eMBB), massive machine-type communication (mMTC), and ultra-reliable and low latency communication (URLLC) are proposed as representative usage scenarios of the NR. In order to meet the requirements of the individual scenarios, it is required to design the NR to have flexible frame structures, compared with the LTE/LTE-Advanced.

In order to satisfy requirements of such usage scenarios, it is necessary to satisfy various requirements of a per-usage scenario basis first. For example, the URLLC is required to satisfy quick data transmission/reception compared with the eMBB.

Since resources for transmitting/receiving radio data are limited, there is a limit to efficiently allocate the resources for satisfying requirements of all scenarios together. That is, the eMBB requires to allocate longer time-domain resources for providing a service to many user equipments. On the contrary, the URLLC requires to allocate shorter time-domain resources for low latency.

Accordingly, it is necessary to multiplex radio resources suitable for each usage scenario by utilizing limited radio resources. Also, it needs to develop a specific method for transmitting and receiving radio signals for providing the radio resources.

DETAILED DESCRIPTION OF THE INVENTION

Technical Problem

In accordance with embodiments of the present disclosure to address such issues, methods are provided for providing each service to a plurality of user equipments, by efficiently allocating limited radio resources, in communication networks configured with several usage services.

Technical Solution

In accordance with an aspect of the present disclosure, a method of a user equipment is provided for receiving a downlink signal. The method includes: receiving configuration information for receiving downlink preemption indication information from a base station, monitoring the downlink preemption indication information based on the configuration information, and receiving the downlink preemption indication information through a multicast signal or a unicast signal. The downlink preemption indication information includes information for indicating superposed radio resources where a radio resource for providing a first service and a radio resource for providing a second service overlap each other.

In accordance with another aspect of the present disclosure, a method of a base station is provided for transmitting a downlink signal. The method includes: configuring configuration information for monitoring downlink preemption indication information, transmitting the configuration information to a user equipment, and transmitting the downlink preemption indication information based on the configuration information through a multicast signal or a unicast signal. The downlink preemption indication information includes information for indicating superposed radio resources where a radio resource for providing a first service and a radio resource for providing a second service overlap each other.

In accordance with still another aspect of the present disclosure, a user equipment is provided for receiving a downlink signal. The user equipment includes: a receiver configured to receive configuration information for receiving downlink preemption indication information from a base station, and a controller configured to monitor the downlink preemption indication information based on the configuration information. The receiver receives the downlink preemption indication information through a multicast signal or a unicast signal. The downlink preemption indication information includes information for indicating superposed radio resources where a radio resource for providing a first service and a radio resource for providing a second service overlap each other.

In accordance with further another aspect of the present disclosure, a base station is provided for transmitting a downlink signal. The base station includes: a controller configured to generate configuration information for monitoring downlink preemption indication information, and a transmitter configured to transmit the configuration information to a user equipment, and to transmit the downlink preemption indication information based on the configuration information through a multicast signal or a unicast signal. The downlink preemption indication information includes information for indicating superposed radio resources where a radio resource for providing a first service and a radio resource for providing a second service overlap each other.

Effects of the Invention

In accordance with embodiments of the present disclosure, it is possible to efficiently multiplex for data traffic between services in a network configured with one or more usage services.

In addition, it is possible to prevent unnecessary processing procedure and data loss when user equipment receives downlink data by multiplexing radio resource.

BEST MODE FOR CARRYING OUT THE INVENTION

Figure 1:
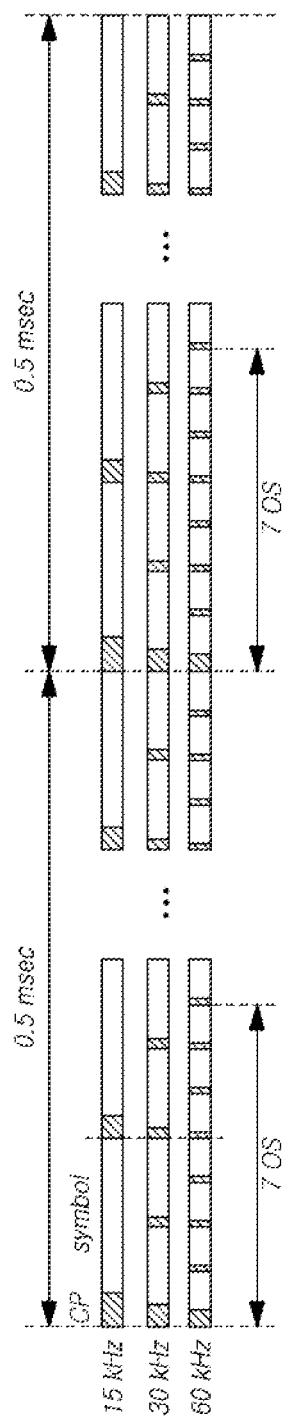
FIG. 1 is a diagram illustrating arrangements of orthogonal frequency division multiple (OFDM) symbols in case of using different subcarrier spacings according to embodiments of the present disclosure.

Hereinafter, embodiments of the present disclosure will be described in detail with reference to the accompanying drawings. In adding reference numerals to elements in each drawing, the same elements will be designated by the same reference numerals, if possible, although they are shown in different drawings. Further, in the following description of the present disclosure, a detailed description of known functions and configurations incorporated herein will be omitted when it is determined that the description may make the subject matter of the present disclosure rather unclear.

In the present disclosure, a wireless communication system refers to a system for providing various communication services such as a voice communication service, a packet data service, etc. The wireless communication system includes user equipment (UE) and a base station (BS).

The UE is a generic term referring to devices used in wireless communication. For example, the UE may be referred to, but not limited to, a UE supporting wideband code division multiple access (WCDMA), long term evolution (LTE), high speed packet access (HSPA), international mobile telecommunications (IMT)-2020 (5G or new radio), or the like, a mobile station (MS) supporting the global system for mobile communication (GSM), a user terminal (UT), a subscriber station (SS), a wireless device, or the like.

The base station or a cell generally refers to a station communicating with the UE. The base station or cell is a generic term referring to, but not limited to, all of various communication service areas and devices, such as a Node-B, an evolved Node-B (eNB), a gNode-B (gNB), a low power node (LPN), a sector, a site, various types of antennas, a base transceiver system (BTS), an access point, a point (e.g., a transmitting point, a receiving point, or a transceiving point), a relay node, a megacell, a macrocell, a microcell, a picocell, a femtocell, a remote radio head (RRH), a radio unit (RU), and a small cell.

Each of the various cells is controlled by a base station. Therefore, the base station may be classified into two categories. 1) The base station may be referred to an apparatus that forms and provides a corresponding communication service area, such as a megacell, a macrocell, a microcell, a picocell, a femtocell, and a small cell, or 2) the base station may be referred to a communication service area. In the case of 1), the base station may be referred to i) apparatuses that form a corresponding service area and provide a communication service within the corresponding service area, and are controlled by the same entity, or ii) apparatus that interact and cooperate with each other for forming the corresponding communication service area and providing a communication service within the corresponding communication service. According to communication schemes employed by a base station, the base station may be referred to as a point, a transmission/reception point, a transmission point, a reception point, or the like. In case of 2), the base station may be a communication service area itself where UEs able to receive signals from or transmit signals to other UEs and neighboring base stations.

In the present disclosure, the cell may also refer to a coverage of a signal transmitted from a transmission/reception point, a component carrier having the coverage of a signal transmitted from a transmission point or a transmission/reception point, or a transmission/reception point itself.

The UE and the base station are two entities for performing transmission/reception used to embody the technology and technical spirit described in the present specification. The UE and the base station are a generic term and not limited to specific terms or words.

Herein, the uplink (hereinafter, referred to as "UL") refers to data transmission/reception by a UE to/from a base station, and the downlink (hereinafter, referred to as "DL") refers to data transmission/reception by a base station to/from a UE.

UL transmission and DL transmission may be performed by employing i) a time division duplex (TDD) technique performing transmission through different time slots, ii) a frequency division duplex (FDD) technique performing transmission through different frequencies, or ii) a hybrid technique of the frequency division duplex (FDD) and the time division duplex (TDD).

Further, the related standard of the wireless communication system defines configuring the UL and the DL based on a single carrier or a pair of carriers.

The UL and the DL transmit control information through one or more control channels, such as a physical DL control channel (PDCCH), a physical UL control channel (PUCCH), and the like. The UL and DL transmit data through data channels, such as a physical DL shared channel (PDSCH), a physical UL shared channel (PUSCH), and the like.

The DL may denote communication or a communication path from multiple transmission/reception points to a UE, and the UL may denote communication or a communication path from the UE to the multiple transmission/reception points. In the DL, a transmitter may be a part of multiple transmission/reception points, and a receiver may be a part of a UE. In the UL, a transmitter may be a part of a UE and a receiver may be a part of multiple transmission/reception points.

Hereinafter, transmission and reception of a signal through a channel such as the PUCCH, the PUSCH, the PDCCH, or the PDSCH, may be described as the transmission and reception of the channel, such as the PUCCH, the PUSCH, the PDCCH, or the PDSCH.

Meanwhile, higher layer signaling includes radio resource control (RRC) signaling transmitting RRC information containing an RRC parameter.

The base station performs DL transmission to UEs. The base station may transmit a physical DL control channel for transmitting i) DL control information, such as scheduling required to receive a DL data channel that is a primary physical channel for unicast transmission, and ii) scheduling approval information for transmission through an UL data channel. Hereinafter, transmitting/receiving a signal through each channel may be described in such a manner that a corresponding channel is transmitted/received.

Any of multiple access techniques may be applied to the wireless communication system, and therefore no limitation is imposed on them. For example, the wireless communication system may employ various multiple access techniques, such as time division multiple access (TDMA), frequency division multiple access (FDMA), CDMA, orthogonal frequency division multiple access (OFDMA), non-orthogonal multiple access (NOMA), OFDM-TDMA, OFDM-FDMA, OFDM-CDMA, or the like. The NOMA includes sparse code multiple access (SCMA), low cost spreading (LDS), and the like.

Embodiments of the present disclosure may be applied to resource allocation in i) asynchronous wireless communication evolving into LTE/LTE-advanced and IMT-2020 from GSM, WCDMA, and HSPA, ii) synchronous wireless communication evolving into CDMA, CDMA-2000, and UMB.

In the present disclosure, a machine type communication (MTC) terminal may refer to a terminal supporting low costs (or low complexity), a terminal supporting coverage enhancement, or the like. As another example, the MTC terminal may refer to a terminal defined as a predetermined category for supporting low cost (or low complexity) and/or coverage enhancement.

In other words, the MTC terminal may refer to a low cost (or low complexity) user equipment category/type newly defined in 3GPP Release-13 and performing LTE-based MTC-related operations. The MTC device of the present disclosure may refer to a device category/type that is defined in or before 3GPP Release-12 that supports enhanced coverage in comparison with the existing LTE coverage or supports low power consumption, or may refer to a low cost (or low complexity) device category/type newly defined in Release-13. The MTC terminal may refer to a further enhanced MTC terminal defined in Release-14.

In the present disclosure, a narrowband Internet of Things (NB-IoT) terminal refers to a terminal supporting radio access for cellular IoT. NB-IoT technology aims at improved indoor coverage, support for large-scale low-speed terminals, low latency sensitivity, very low terminal costs, low power consumption, and optimized network architecture.

An enhanced mobile broadband (eMBB), massive machine-type communication (mMTC), and ultra-reliable and low latency communication (URLLC) are proposed as representative usage scenarios for NR having been discussed in the 3GPP recently.

In the present disclosure, a frequency, a frame, a sub-frame, a resource, a resource block (RB), a region, a band, a sub-band, a control channel, a data channel, a synchronization signal, various reference signals, various signals, and various messages, associated with NR may be interpreted as meanings that were used in the past or are used in the present or as various meanings that will be used in the future.

NR(New Radio)

Recently, the 3GPP has approved the "Study on New Radio Access Technology", which is a study item for research on next-generation/5G radio access technology. On the basis of the Study on New Radio Access Technology, discussions have been in progress for frame structures, channel coding and modulation, waveforms, multiple access methods, and the like for the new radio (NR).

The NR is required to be designed not only to provide an improved data transmission rate as compared with the long term evolution (LTE)/LTE-Advanced, but also to meet various requirements per detailed and specific usage scenario. An enhanced mobile broadband (eMBB), massive machine-type communication (mMTC), and ultra-reliable and low latency communication (URLLC) are proposed as representative usage scenarios of the NR. In order to meet the requirements per usage scenario, it is required to design the NR to have flexible frame structures, compared with the LTE/LTE-Advanced.

Specifically, the eMBB, mMTC, URLLC are considered as representative usage scenarios of the NR by the 3GPP. Since each usage scenario imposes different requirements for data rates, latency, coverage, etc., there arises a need for a method of efficiently multiplexing numerology-based (e.g., a subcarrier spacing (SCS), a subframe, a transmission time interval (TTI), etc.) radio resource units different from each other, as a solution for efficiently satisfying requirements according to usage scenarios through a frequency band provided to an arbitrary NR system.

To this end, there have been discussions on i) methods of multiplexing numerologies having subcarrier spacing (SCS) values different from one another based on TDM, FDM or TDM/FDM through one NR carrier, and ii) methods of supporting one or more time units in configuring a scheduling unit in the time domain. In this regard, in the NR, a subframe is defined as one type of a time domain structure. In addition, as a reference numerology to define a corresponding subframe duration, a single subframe duration is defined as having 14 OFDM symbols of normal CP overhead based on 15 kHz subcarrier spacing (SCS), like the LTE. Therefore, the subframe of the NR has the time duration of 1 ms. Unlike the LTE, since the subframe of the NR is an absolute reference time duration, a slot and a mini-slot may be defined as a time unit for actual UL/DL data scheduling. In this case, the number of OFDM symbols which constitutes a slot, a value of y, has been defined as y=14 regardless of the numerology.

Therefore, a slot may be made up of 14 symbols. In accordance with a transmission direction for a corresponding slot, all symbols may be used for DL transmission or UL transmission, or the symbols may be used in the configuration of a DL portion+a gap+a UL portion.

Further, a minislot made up of fewer symbols than the slot has been defined in a numerology (or SCS). As a result, a short time domain scheduling interval may be configured for UL/DL data transmission or reception based on the minislot.

Also, a long time domain scheduling interval may be configured for the UL/DL data transmission or reception by slot aggregation.

Particularly, in the case of the transmission or reception of latency critical data, such as the URLLC, it is difficult to satisfy latency requirements if scheduling is performed on a per-slot basis based on 0.5 ms (7 symbols) or 1 ms (14 symbols) defined in a frame structure based on a numerology having a small SCS value (for example, 15 kHz). To this end, a mini-slot may be defined to include fewer OFDM symbols than the slot. Accordingly, the scheduling for the latency critical data, such as the URLLC, may be performed based on the mini-slot.

Further, methods have been discussed for scheduling data according to latency requirements based on a slot (or a minislot) length defined for each numerology, by multiplexing numerologies having different SCS values from one another in one NR carrier, using the TDM or FDM technique, as described above. For example, since the length of a symbol for the SCS of 60 kHz as in FIG. 1 is shortened by about a fourth of that for the SCS of 15 kHz, the length of the slot based on the SCS of 15 kHz is 0.5 ms when one slot is comprised of seven OFDM symbols in both the cases. On the contrary, the length of the slot based on the SCS of 60 kHz is shortened to about 0.125 ms.

As described above, discussion has been conducted for developing methods of satisfying each requirement of URLLC and eMBB by defining different SCSs or different TTI lengths in the NR.

As described above, in order to support URLLC service in the NR, it is necessary to support a short scheduling unit or transmission time interval, (TTI) for satisfying latency boundary in the time domain. On the other hand, in defining a scheduling unit in the time domain in the eMBB or the mMTC, it may be more efficient to use a longer time-domain resource allocation unit compared with the URLLC usage scenario in terms of control overhead and coverage. Thus, as methods for satisfying various NR usage scenarios together, it is necessary to support a mixed numerology structure for supporting, through one NR carrier, both a numerology of subcarrier spacing (e.g., larger subcarrier spacing, such as 60 kHz, 120 kHz, etc.) that is easy to define a short time-domain resource allocation unit suitable for the URLLC and a numerology of subcarrier spacing (e.g., 15 kHz for eMBB or 3.75 KHz for mMTC) suitable for the eMBB and the mMTC, or it is necessary to support simultaneously time-domain scheduling units with lengths each different from another, such as a subframe, a mini-slot, a slot, etc. in an NR carrier operated with a numerology.

For example, a time/frequency resource (or region) on which a resource is allocated based on an optimal scheduling unit for each usage scenario may be allocated semi-statically, and resource allocation may be performed using a time/frequency resource of a corresponding region according to each usage scenario for each UE.

However, if a region for each usage scenario is divided by such a semi-static method, efficiency may be reduced from an NR system perspective. For example, in an NR cell sparsely having URLLC traffic, it may be undesirable to allocate always exclusively a time/frequency resource supporting a short time-domain scheduling unit in order to satisfy the sparsely occurred URLLC service.

Accordingly, to address this issue, a scheduling method is required to satisfy a latency requirement of the URLLC by dynamically using a part of scheduling resources of the eMBB or the mMTC whenever URLLC traffic occurs.

To this end, in the NR, an eMBB/URLLC multiplexing method based on dynamic puncturing may be considered using for urgent URLLC data transmission/reception by puncturing one or more OFDM symbols of resources allocated for a data channel of an eMBB or a mMTC. That is, in URLLC data transmission/reception, a method may be considered for supporting preemption-based scheduling.

Specifically, in case dynamic puncturing based multiplexing is applied between the eMBB and the URLLC, it may consider a pre-notification method for indicating corresponding information before the puncturing is performed and a post-notification method for indicating the corresponding puncturing after corresponding on-going transmission has been completed as a method for indicating a notification to an corresponding eMBB UE for a resource on which the puncturing is performed for URLLC data transmission.

The present disclosure introduces various embodiments for notifying information on punctured radio resources when radio resources are dynamically punctured.

Embodiments described below may be applied to all UEs, base stations, and core network entities (MME) using mobile communication technologies. For example, embodiments of the present disclosure may be applied not only to mobile communication UEs employing long term evolution technology, but also to next generation mobile communication (5G mobile communication, New-RAT) UEs, base stations, and access and mobility functions (AMF). For convenience of description, a base station may denote an eNB of LTE/E-UTRAN, or denote at least one of a central unit (CU), a distribute unit (DU), and an object in which the CU and the DU are implemented as one logical object, or a gNB, in a 5G radio network in which the CU is separated from the DU.

Meanwhile, the URLLC of the usage scenarios of the NR denotes a service supporting high reliability and low latency. The URLLC may be a service used when a serious problem arises if transmission/reception of the data is delayed although the size of data is not large. For example, the URLLC may be used for an autonomous vehicle because a traffic accident may occur when data transmission/reception is delayed.

The eMBB uses a service of supporting data transmission at high speed and may denote a service used for transmitting and receiving a large amount of data. For example, the eMBB service may be used for transmitting and receiving a large amount of data. That is, the eMBB service may be used for a 3D video service, a UHD service, or the like.

The mMTC may denote a service used for transmitting and receiving a comparatively small size of data. For example, the mMTC service may be used for sensors installed for Smart City deployment which requires a long operation time with a mounted battery.

In a general case, one of the URLLC service, the eMBB service, and the mMTC service may be used depending on characteristics of a UE. Hereinafter, a UE using the URLLC service may be referred to as a URLLC UE, and UEs using the eMBB service and the mMTC service may be referred to as an eMBB UE and an mMTC UE, respectively. In addition, the eMBB, the mMTC, and the URLLC may also be interpreted as the eMBB UE, the mMTC UE, the URLLC UE.

The term "preemption" in the present disclosure may denote that when traffic for the URLLC occurs, one or more of resources allocated for the eMMB or the mMTC are re-allocated to the URLLC for satisfying a latency requirement for the URLLC. At this time, since the URLLC uses one or more resources originally allocated to an eMBB or an mMTC, it is necessary for the eMBB UE or the mMTC UE to which the one or more resources are originally allocated to receive information for indicating preempted resource. DL preemption means that a DL resource of a UE is preempted.

In addition, DL preemption indication information denotes information for informing of the UE DL preemption as information for indicating which data channel is preempted in DL to a UE. In other words, DL preemption indication information may be expressed as DL preemption notification information. The DL preemption indication information may be indicated in a signal type or a channel type.

In addition, an eMBB UE and an URLLC UE in the present disclosure employ concepts under discussion in the 3GPP, and it is noted that a specific distinction between them may be determined depending on whether monitoring is performed for dynamic puncturing notification information and a length of a time-domain scheduling unit.

For example, in case of dynamic puncturing, a UE required to monitor notification information (or channel) on the dynamic puncturing may correspond to an eMBB UE, and a UE not required to monitor may correspond to an URLLC UE. In addition, distinction between the MBB UE and the URLLC UE may be determined by a subcarrier spacing (SCS) value configured for a corresponding UE and a time-domain scheduling unit (e.g., a slot, an aggregated slot, a mini-slot etc.) allocated for the UE. For example, a UE configured with a slot unit less than and equal to a specific SCS value or a long time-domain scheduling unit of an aggregate-slot unit may be an eMBB UE, and a UE configured with a slot unit greater than and equal to a specific SCS value or configured with a short time-domain scheduling unit based on a unit of a mini-slot in a SCS less than and equal to a specific value may be an URLLC UE. Alternatively, in case a reference value (e.g., X ms) of a time-domain scheduling unit (or interval) for distinguishing the eMBB and the URLLC is defined, a UE configured with a time-domain scheduling unit greater than the reference value (threshold) may be an eMBB UE, and a UE configured with a time-domain scheduling unit less than the reference value (threshold) may be an URLLC UE.

Figure 2:
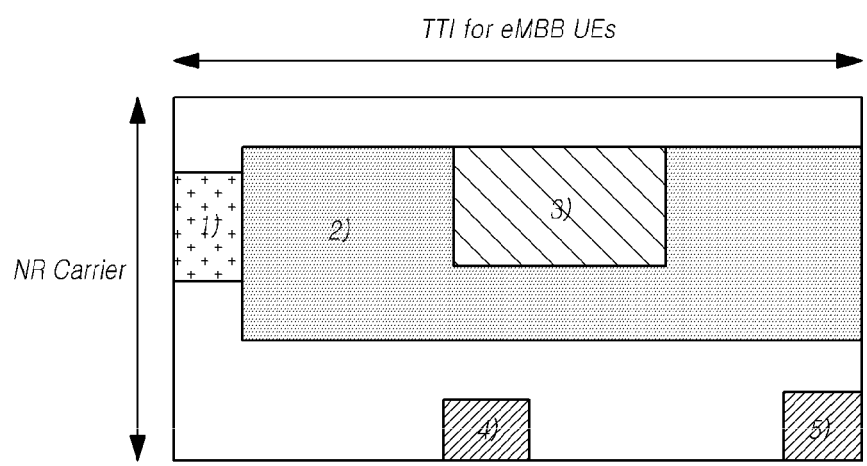
FIG. 2 is a diagram illustrating a method for transmitting DL preemption indication information to a UE through a pre-notification method or a post-notification method, according to embodiments of the present disclosure.

FIG. 2 is a diagram for describing a method for transmitting DL preemption indication information to a UE through a pre-notification method or a post-notification method, according to embodiments of the present disclosure.

Referring to FIG. 2, the horizontal axis represents a TTI for eMBB UEs as a time domain resource, and the vertical axis represents an NR carrier as a frequency domain resource.

Among regions as shown in FIG. 2, the 1) region is a region for transmitting a DL control channel (PDCCH) for an eMMB UE, and the DL control channel includes scheduling information on a DL data channel (PDSCH) for the eMBB UE.

The 2) region represents a region for transmitting the DL data channel to the eMBB UE.

The 3) region represents a region for enabling a URLLC UE to transmit a DL control channel (PDCCH) or DL data channel (PDSCH) through a preempted resource, when DL preemption occurs. In this case, the eMBB UE is required to monitor information that the corresponding resource has been preempted by the URLLC UE, that is, DL preemption indication information, to recognize the occurrence of the DL preemption and to respond thereto.

At this time, in case the pre-notification method is used, DL preemption indication information corresponding to the 4) region is transmitted to the eMBB UE, before the preemption occurs.

On the other hand, in case the post-notification method is used, DL preemption indication information corresponding to the 5) region is transmitted to the eMBB UE, after the preemption has occurred.

Figure 3:
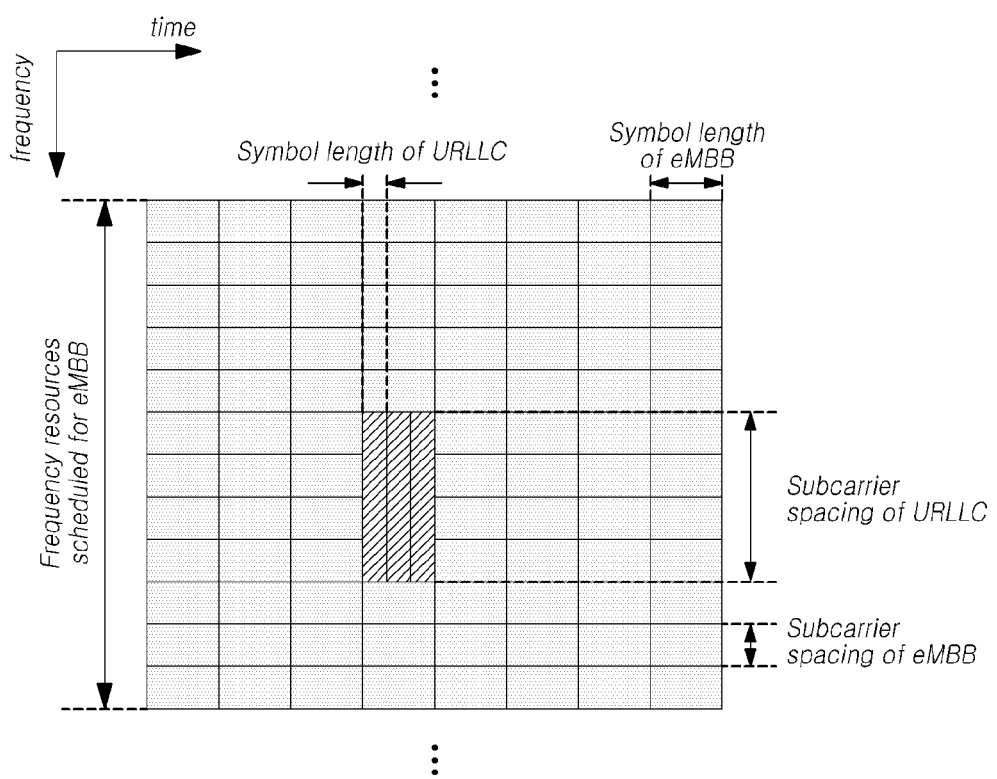
FIG. 3 is a diagram for describing multiplexing radio resources for different services according to an embodiment of the present disclosure.

FIG. 3 is a diagram for describing multiplexing radio resources for different services according to an embodiment of the present disclosure.

Referring to FIG. 3, a radio resource for the eMBB and a radio resource for the URLLC may be configured with a subcarrier spacing and a symbol length different from each other. For example, the subcarrier spacing for the URLLC may be configured three times the subcarrier spacing for the eMBB. The symbol length for the URLLC may be configured to have one-third of the symbol length for the eMBB.

Accordingly, radio resources for the eMBB and the URLLC may be multiplexed, as shown in FIG. 3.

Figure 4:
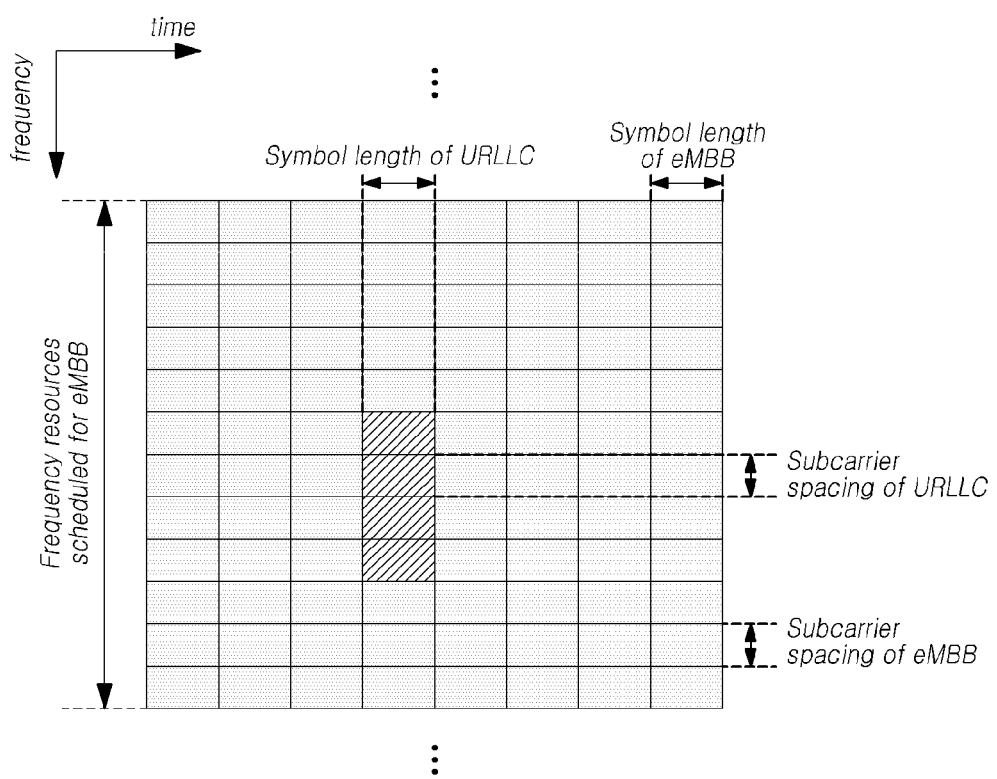
FIG. 4 is a diagram for describing multiplexing radio resources for different services according to another embodiment of the present disclosure.

FIG. 4 is a diagram for describing multiplexing radio resources for different services according to another embodiment of the present disclosure.

Referring to FIG. 4, the eMBB and the URLLC may be configured with an identical subcarrier spacing and an identical symbol length. In this case, as shown in FIG. 4, radio resources for the eMBB and the URLLC may be multiplexed.

In accordance with at least one embodiment, it is necessary to inform if radio resources allocated for different services overlap each other or if one or more radio resources allocated to a service for sparsely generated traffic is allocated for other services. Hereinafter, operations of a UE and a base station to notify the UE will be described with reference to the accompanying drawings.

Figure 5:
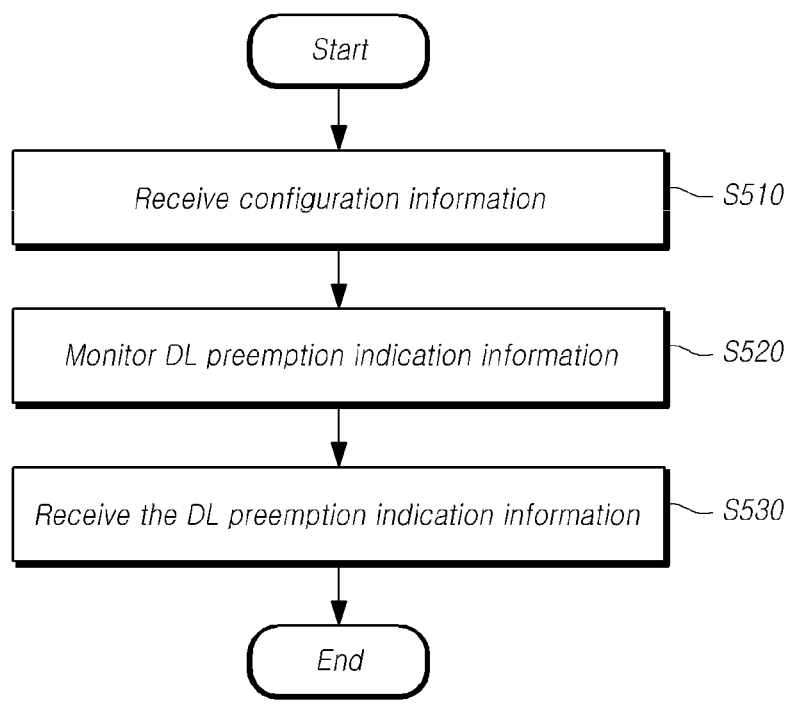
FIG. 5 is a flowchart illustrating operation of a user equipment according to embodiments of the present disclosure.

FIG. 5 is a flowchart illustrating operation of a UE according to embodiments of the present disclosure.

Referring to FIG. 5, the UE may perform operations for receiving configuration information for receiving DL preemption indication information from a base station at step S510. For example, the UE may receive the configuration information for monitoring the DL preemption indication information. For example, the configuration information may be received through cell-specific signaling or UE-specific signaling. For example, the configuration information may be received through UE-specific RRC signaling. For another example, the configuration information may be received through cell-specific RRC signaling. For further another example, the configuration information may be received through UE-group common signaling.

Meanwhile, the configuration information may include at least one of a subcarrier spacing, duration information, frequency resource information, a cell-specific RNTI and a slot index. The UE may recognize a resource for implicitly receiving the DL preemption indication information through this.

In addition, the UE may perform operations for monitoring the DL preemption indication information based on the configuration information at step S520. For example, the UE may recognize a radio resource to be monitored using the configuration information. For example, the UE may monitor a DL control channel. Specifically, the UE may monitor a common search space or a group common search space of a DL control channel. In addition, the UE may monitor a UE-specific search space of a DL control channel.

Meanwhile, the UE may perform monitoring in a blind decoding manner. For example, the UE may perform monitoring by performing CRC scrambling of DL control information including DL preemption indication information using a cell-specific radio network temporary identifier (RNTI). For example, the cell-specific RNTI may be configured through cell-specific high layer signaling, or configured in advance with a pre-configured value. For another example, the UE may perform monitoring by performing CRC scrambling of DL control information including DL preemption indication information using a C-RNTI or a newly defined RNTI. For example, the C-RNTI or the newly defined RNTI may be received through UE-specific RRC signaling.

In addition, the UE may include operations for receiving the DL preemption indication information through a multicast signal or a unicast signal at step S530. As an example, the DL preemption indication information may include information for indicating a radio resource on which a radio resource for providing a first service and a radio resource for providing a second service overlap each other. As another example, the DL preemption indication information may include information for indicating a radio resource configured for a pre-configured specific service (e.g., the URLLC service).

For example, the DL preemption indication information may be received through a common search space or a group common search space of a DL control channel. That is, the DL preemption indication information may be received through cell-specific signaling. For another example, the DL preemption indication information may be received through a UE-specific search space of a DL control channel. That is, the DL preemption indication information may be received through UE-specific signaling.

The UE may recognize that a radio resource indicated by the DL preemption indication information is a resource which is tentatively allocated for a specific service, by receiving the DL preemption indication information. For example, the above described UE may be an eMBB UE, and a UE indicating a radio resource through DL preemption indication information may be an URLLC UE. That is, the first service may be the eMBB, and the second service may be the URLLC. Alternatively, the first service may be the URLLC, and the second service may be the eMBB. Likewise, the above embodiments or examples may be applicable to a case where the mMTC is used instead of eMBB.

Figure 6:
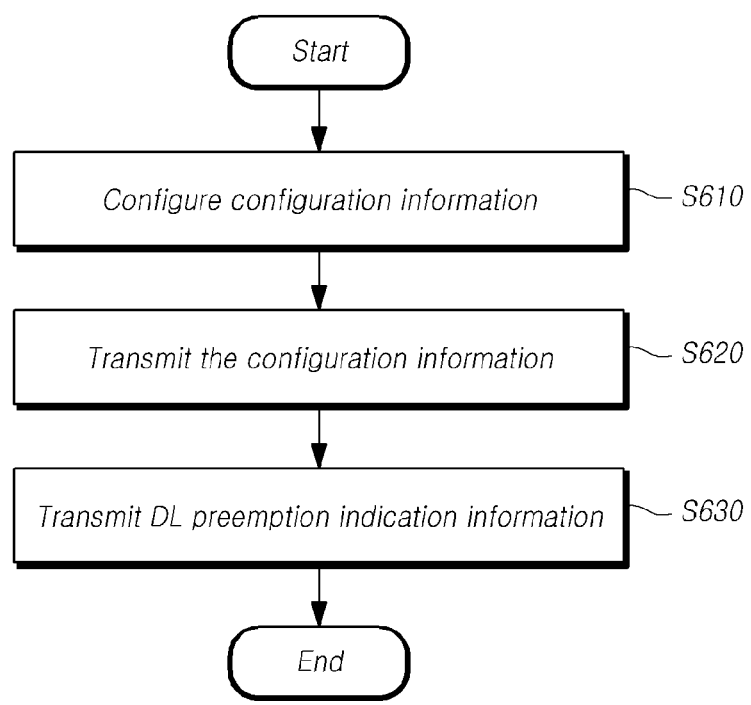
FIG. 6 is a flowchart illustrating operation of a base station according to embodiments of the present disclosure.

FIG. 6 is a flowchart illustrating operation of a base station according to embodiments of the present disclosure.

Referring to FIG. 6, the base station may perform operations for generating (e.g., creating or configuring) configuration information for monitoring DL preemption indication information at step S610. As described above, the configuration information may include information for enabling a UE to monitor. For example, the configuration information may include at least one of a subcarrier spacing, duration information, frequency resource information, a cell-specific RNTI and a slot index. The UE may recognize a resource for implicitly receiving the DL preemption indication information through this.

The base station may perform operations for transmitting the configuration information to the UE at step S620. For example, the configuration information may be transmitted through cell-specific signaling or UE-specific signaling. For example, the configuration information may be transmitted through UE-specific RRC signaling. As another example, the configuration information may be transmitted through cell-specific RRC signaling. As further another example, the configuration information may be transmitted through UE-group common signaling.

The base station may perform operations for transmitting the DL preemption indication information based on the configuration information through a multicast signal or a unicast signal at step S630. For example, the DL preemption indication information may include information for indicating a radio resource for providing a first service and a radio resource for providing a second service overlap each other. As another example, the DL preemption indication information may include information for indicating a radio resource for a pre-configured specific service (e.g., the URLLC service).

For example, the DL preemption indication information may be transmitted through a common search space or a group common search space of a DL control channel. That is, the DL preemption indication information may be transmitted through cell-specific signaling. For another example, the DL preemption indication information may be transmitted through a UE-specific search space of a DL control channel. That is, the DL preemption indication information may be transmitted through UE-specific signaling. The UE may receive the DL preemption indication information and recognize that the received DL preemption indication information indicates a radio resource tentatively allocated for a specific service.

As described above, the UE may receive the DL preemption indication information including information for indicating a radio resource for a specific service, and the base station may configure dynamically the radio resource. Accordingly, it is possible to provide various services by multiplexing the services.

Hereinafter, transmission/reception of the DL preemption indication information will be discussed in detail for each of an embodiment of using cell-specific signaling and an embodiment of using UE-specific signaling. In addition, each embodiment will be described for each of the pre-notification method and the post-notification method, and operations for transmitting/receiving configuration information will be also described in the same manner. For convenience of description and ease of understanding, the following embodiments will be discussed based on a scenario in which an eMBB UE receives DL preemption indication information on an URLLC radio resource, but embodiments of the present disclosure are not limited thereto.

Embodiment 1: Indicating Through Cell-Specific (or Slot-Specific) Signaling

An NR cell/base station may transmit cell-specifically notification information (the DL preemption indication information described above) for punctured resources for eMBB data or superposed resources for eMBB DL data and URLLC DL data for transmitting URLLC data in a time-domain scheduling unit (e.g., a slot or an aggregated-slot) defined for an eMBB UE. In addition, the base station may transmit the DL preemption indication information in a UE common signaling manner or a UE-group common signaling manner.

Specifically, when pre-notification-based dynamic puncturing or post-notification-based dynamic puncturing is applied, the base station may perform, through cell-specific or UE common/group-UE common signaling, the broadcasting or multicasting of resource information used for transmitting URLLC data in a corresponding slot (when pre-notification or post-notification is applied) or a prior slot (when post-notification is applied), that is, information (e.g., DL preemption indication information) on punctured resources or superposed resources with URLLC data, from an eMBB perspective.

For example, in case of the pre-notification method, the base station may transmit, to an eMBB UE in a corresponding cell, resource allocation information for transmitting DL (or UL) URLLC data in a slot, that is, information (DL preemption indication information) on a punctured resource or a superposed resource for transmitting eMBB data transmitted through the corresponding slot, through common L1 control signaling in a common search space of an NR DL control channel (NR PDCCH) of the corresponding slot. Alternatively, in defining a dynamic puncturing (or superposition) notification signaling method transmitted between on-going data transmissions through the corresponding slot, the dynamic puncturing signaling may be performed by transmitting the DL preemption indication information commonly to all eMBB UEs in the cell (or configured to monitor dynamic puncturing/superposition notification in the slot). In this case, a search space or a transmission resource for receiving the DL preemption indication information may be configured commonly for all eMBB UEs in the cell (or configured to monitor dynamic puncturing/superposition notification in the slot). Specifically, a period of a cell-specific search space, a UE/group-UE common search space, or a pre-configured resource, for receiving the DL preemption indication information may be determined implicitly by a function of a subcarrier spacing and a slot duration, or may be configured through cell-specific RRC signaling. Frequency resource information (e.g., a sub-band or a (set of) PRB(s)) may be determined by a function of a cell-specific RNTI, a slot index, or the like for receiving cell-specific DL preemption indication information, or may be determined by cell-specific RRC signaling. Alternatively, the frequency resource information may be configured in advance.

For another example, in case of the post-notification method, the base station may transmit, to an eMBB UE in a corresponding cell, resource allocation information for transmitting URLLC data in a prior slot, that is, information (DL preemption indication information) on a punctured resource or a superposed resource for transmitting eMBB data transmitted through a corresponding slot, through common L1 control signaling in a common search space of an NR PDCCH of the corresponding slot. Alternatively, in case the post-notification method is defined for enabling DL preemption indication information in a corresponding slot to be transmitted to one or more last symbols in the slot, the DL preemption indication information may be transmitted to all eMBB UEs commonly in a corresponding cell (or configured to monitor dynamic puncturing/superposition notification in the slot). In this case, as in the embodiments of the pre-notification, a search space or a transmission resource for receiving the DL preemption indication information may be configured commonly for all eMBB UEs in the cell (or configured to monitor dynamic puncturing/superposition notification in the slot). In this case, as in the pre-notification method described above, a cell-specific search space, a UE/group-UE common search space, or a pre-configured frequency resource information (e.g., a sub-band or a (set of) PRB(s)), for receiving the DL preemption indication information i) may be determined by a function of a cell-specific RNTI, a slot index, or the like for receiving cell-specific DL preemption indication information, ii) may be determined by cell-specific RRC signaling, or iii) may be configured in advance.

Meanwhile, in case a blind decoding-based monitoring method for receiving DL preemption indication information is applied through an NR PDCCH or a separate L1 control channel, the cell-specific RNTI for CRC scrambling of DL control information including the DL preemption indication information may be configured through cell-specific higher layer signaling by a base station, or configured with a pre-configured value in advance.

Furthermore, in case of performing such a cell-specific (or UE common, UE-group common) dynamic puncturing notification, in case of an eMBB UE performing data channel resource allocation in a corresponding slot, puncturing or superposition may be applied for transmitting/receiving corresponding eMBB data only when puncturing/superposition resource allocation information through the DL preemption indication information and data channel resource allocation information for the eMBB UE partially overlap each other.

As described above, the DL preemption indication information may be transferred equally to a plurality of UEs, or one or more UEs included in a group of UEs cell-specifically or by a multicasting technique.

Embodiment 2: Indicating UE-Specifically or Slot-Specifically

An NR cell/base station may transmit UE-specifically notification information (the DL preemption indication information) for punctured resources for eMBB data or superposed resources for eMBB DL data and URLLC DL data, for transmitting URLLC data in a time-domain scheduling unit (e.g., a slot or an aggregated-slot) defined for an eMBB UE.

Specifically, when pre-notification-based dynamic puncturing or post-notification-based dynamic puncturing is applied and when eMBB UEs use one or more allocated resources (e.g., allocated for the DL data) for transmitting URLLC data by eMBB UEs performing DL data resource allocation in a corresponding slot (when pre-notification or post-notification is applied) or a prior slot (when post-notification is applied), each eMBB UE may be configured to unicast such information through UE-specific signaling.

For example, in case of the pre-notification method, the transmission of DL (or UL) data transmission resource allocation information for a corresponding UE in a corresponding slot through UE-specific DCI or DL assignment DCI in a common search space of an NR PDCCH of the slot may be generated, by including resource allocation information used for transmitting URLLC data of allocated resources and information (DL preemption indication information) for indicating whether puncturing or superposition is performed for resources allocated for transmitting the URLLC data. Alternatively, in defining a DL preemption indication information signaling method for transmitting between on-going data transmissions for an eMBB UE for transmitting DL data through a corresponding slot, by defining a search space or a resource for receiving UE-specific DL preemption indication information for each UE, the DL preemption indication information may be transmitted UE-specifically based the defined search space or resource. In this case, a period of the search space or the resource for receiving the DL preemption indication information in the slot may be determined implicitly by a function of a subcarrier spacing and a slot duration, or may be defined through UE-specific or cell-specific RRC signaling. Frequency resource information (e.g., a sub-band or a (set of) PRB(s)) may be determined by a function an identifier of the UE (e.g., a C-RNTI), a slot index, an index of an RB (e.g., a lowest RB index or a highest RB index) on which the eMBB data transmission is performed, or the like, or may be determined by UE-specific/cell-specific RRC signaling.

As another example, in case of the post-notification method, resource information used for transmitting URLLC DL data of DL data resources received in a prior slot and DL control information for indicating whether puncturing or superposition is performed for resources allocated for transmitting the URLLC may be transmitted through UE-specific L1 control signaling of a UE-specific search space of an NR PDCCH of a slot. Alternatively, in defining a post-notification method for signaling DL preemption indication information in a slot through one or more last symbols of the slot on which DL eMBB data transmission has been performed, the signaling of the DL preemption indication information to this end may be performed such that a search space or a resource for receiving UE-specific DL preemption indication information for each UE is defined in the same manner as the pre-notification case described above, and DL preemption indication information is transmitted UE-specifically based on the defined search space or resource. In this case, information (e.g., a sub-band or a (set of) PRB(s)) on the search space or the resource for receiving the DL preemption indication information in the slot may be determined by a function of an identifier of the corresponding UE (e.g., a C-RNTI), a slot index, an index of an RB (e.g., a lowest RB index or a highest RB index) on which the eMBB data transmission is performed, or the like, or may be determined by UE-specific/cell-specific RRC signaling.

Meanwhile, in case a blind decoding-based monitoring method for receiving DL preemption indication information is applied through an NR PDCCH or a separate L1 control channel, for a RNTI for CRC scrambling of DCI for DL indication information, a C-RNTI may be reused, or a base station may configure a separate UE-specific RNTI to this end and transmit to each UE through UE-specific RRC signaling.

As described above, the base station may transmit the DL preemption indication information through UE-specific signaling. In addition, the UE may receive configuration information (e.g., the RNTI etc.) for monitoring the DL preemption indication information through UE-specific or cell-specific RRC signaling.

Hereinafter, structures of a UE and a base station for performing any part or all of the embodiments described above will be discussed with reference to the accompanying drawings.

Figure 7:
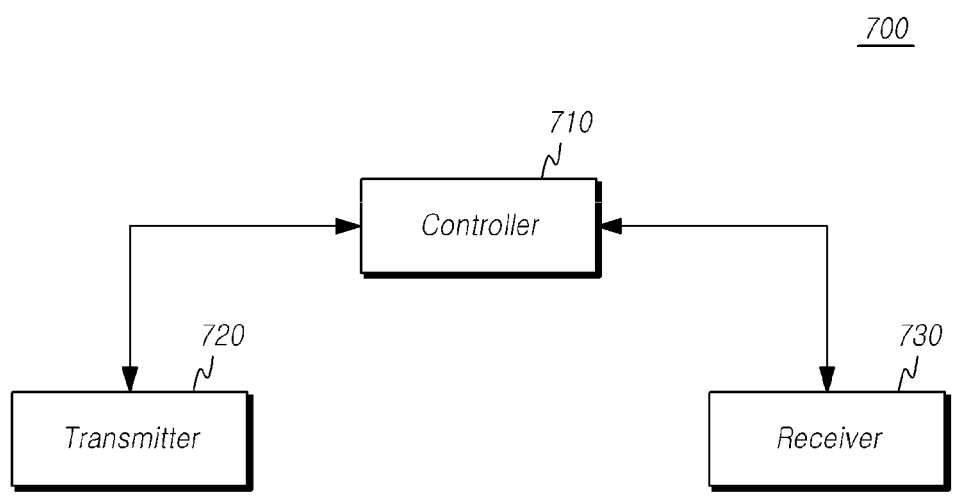
FIG. 7 is a block diagram illustrating a user equipment according to embodiments of the present disclosure.

FIG. 7 is a block diagram illustrating a UE according to embodiments of the present disclosure.

Referring to FIG. 7, a UE 700 may include a receiver 730 configured to receive configuration information for receiving DL preemption indication information from a base station and a controller 710 configured to monitor the DL preemption indication information based on the configuration information.

In addition, the receiver 730 may receive the DL preemption indication information through a multicasting signal or a unicasting signal. The DL preemption indication information may include information for indicating superposed radio resources where radio resources for providing a first service and radio resources for providing a second service overlap (e.g., are superposed) each other. Further, at least one of a subcarrier spacing and a time-domain scheduling unit of the radio resource for providing the first service may be different from that of the radio resource for providing the second service. Alternatively, the radio resource for providing the first service and the radio resource for providing the second service may be configured with an identical subcarrier spacing and time-domain scheduling unit.

Meanwhile, the configuration information may be received through UE-specific RRC signaling, and the DL preemption indication information may be received through a common search space or group common search space of a DL control channel, or may be received through a UE-specific search space of the DL control channel.

In addition, the receiver 730 is configured to receive DL control information and data, messages from the base station through a corresponding channel.

Furthermore, the controller 710 controls overall operations of the UE 700 for receiving dynamically the DL preemption indication information and using radio resources by multiplexing, according to embodiments of the present disclosure.

The transmitter 720 is configured to transmit UL control information and data, messages to the base station through a corresponding channel.

Figure 8:
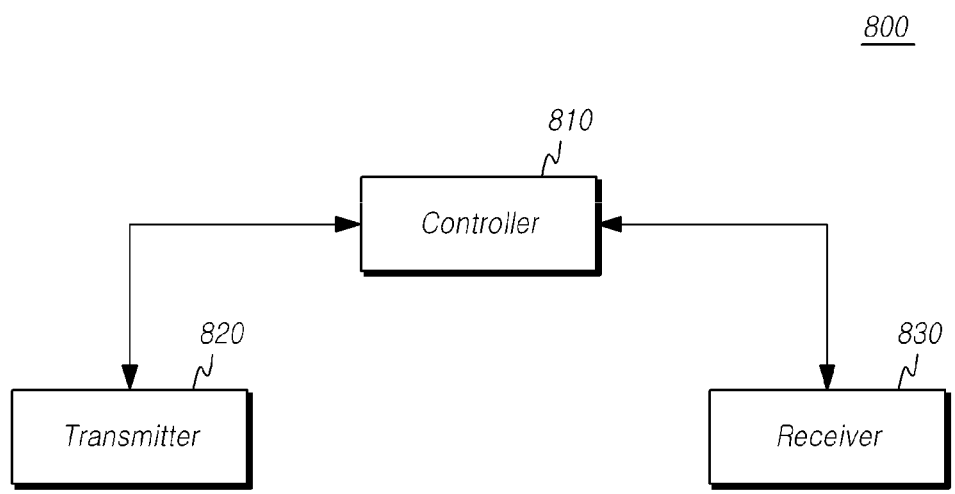
FIG. 8 is a block diagram illustrating a base station according to embodiments of the present disclosure.

FIG. 8 is a block diagram illustrating a base station according to embodiments of the present disclosure.

Referring to FIG. 8, the base station 800 may include a controller 810 configured to generate (e.g., create or configure) configuration information for monitoring DL preemption indication information, and a transmitter 820 configured to transmit the configuration information to a UE and transmit the DL preemption indication information based on the configuration information through a multicast signal or a unicast signal. The DL preemption indication information may include information for indicating superposed radio resources where radio resources for providing a first service and radio resources for providing a second service overlap (e.g., are superposed) each other. Further, at least one of a subcarrier spacing and a time-domain scheduling unit of the radio resource for providing the first service may be different from that of the radio resource for providing the second service. Alternatively, the radio resource for providing the first service and the radio resource for providing the second service may be configured with an identical subcarrier spacing and time-domain scheduling unit.

Meanwhile, the configuration information may be transmitted through UE-specific RRC signaling, and the DL preemption indication information may be transmitted through a common search space or group common search space of a DL control channel, or may be transmitted through a UE-specific search space of the DL control channel.

In addition, the controller 810 is configured to control overall operations of the UE 800 for dynamically configuring and transmitting the DL preemption indication information and using radio resources by multiplexing, according to embodiments of the present disclosure.

In addition, the transmitter 820 and the receiver 830 are configured to transmit or receive signals, messages, data required to perform embodiments described above to or from a UE.

The standardized specifications or standard documents related to the embodiments described above constitute a part of the present disclosure. Accordingly, it should be construed that the incorporation of the content of the standardized specifications and part of the standard documents into the detailed description and claims is included within the scope of the present disclosure.

Although a preferred embodiment of the present disclosure has been described for illustrative purposes, those skilled in the art will appreciate that various modifications, additions and substitutions are possible, without departing from the scope and spirit of the invention as disclosed in the accompanying claims. Therefore, exemplary aspects of the present disclosure have not been described for limiting purposes, but to describe the embodiments, the therefore, the scope of the present disclosure shall not be limited to such embodiments. The scope of protection of the present disclosure should be construed based on the following claims, and all technical ideas within the scope of equivalents thereof should be construed as being included within the scope of the present disclosure.

CROSS-REFERENCE TO RELATED APPLICATION

If applicable, this application claims priority under 35 U.S.C § 119(a) of Patent Application No. 10-2016-0152659, filed on Nov. 16, 2016, and Patent Application No. 10-2017-0151983, filed on Nov. 15, 2017, in Korea, the entire contents of which are incorporated herein by reference. In addition, this non-provisional application claims priorities in countries other than the U.S. for the same reason based on the Korean Patent Applications, the entire contents of which are hereby incorporated by reference.

The invention claimed is:

1. A method of receiving a downlink (DL) signal by a first user equipment (UE), the method comprising:
receiving, by the first UE, a specific radio network temporary identifier (RNTI) for DL preemption indication information through a UE-specific radio resource control (RRC) signaling;
after receiving the specific RNTI, monitoring, by the first UE, a DL control channel for receiving the DL preemption indication information based on the received specific RNTI; and
receiving, by the first UE, the DL preemption indication information through a multicast signal,
wherein the specific RNTI received through the UE specific RRC signaling is a newly defined RNTI other than at least a cell-RNTI (C-RNTI),
wherein the DL preemption indication information indicates preempted resource information in a prior slot, which precedes a slot in which the DL preemption indication information is received,
wherein the specific RNTI is received with information related to time and frequency, and
wherein the information related to time and frequency is received for the reception of the DL preemption indication information through the UE-specific RRC signaling.

2. The method according to claim 1, wherein at least one of a subcarrier spacing and a time-domain scheduling unit of first radio resources allocated for the first UE are different from second radio resources allocated for a second UE.

3. The method according to claim 1, wherein the DL preemption indication information is received through a common search space of the DL control channel.

4. The method according to claim 1, wherein the time and frequency information comprises frequency resource information and slot index information.

5. A method of transmitting a downlink (DL) signal by a base station (BS), the method comprising:
configuring, by the BS, a specific radio network temporary identifier (RNTI) for DL preemption indication information;
transmitting, from the BS, the configured specific RNTI to a first user equipment (UE) through a UE-specific radio resource control (RRC) signaling; and
transmitting, from the BS, the DL preemption indication information based on the specific RNTI through a multicast signal,
wherein the specific RNTI transmitted through the UE specific RRC signaling is a newly defined RNTI other than at least a cell-RNTI (C-RNTI),
wherein the DL preemption indication information indicates preempted resource information in a prior slot, which precedes a slot in which the DL preemption indication information is transmitted,
wherein the specific RNTI is transmitted with information related to time and frequency, and
wherein the information related to time and frequency is transmitted for a reception of the DL preemption indication information by the first UE through the UE-specific RRC signaling.

6. The method according to claim 5, wherein at least one of a subcarrier spacing and a time-domain scheduling unit of first radio resources allocated for the first UE are different from second radio resources allocated for a second UE.

7. The method according to claim 5, wherein the DL preemption indication information is transmitted through a common search space of the DL control channel.

8. The method according to claim 5, wherein the time and frequency information comprises frequency resource information and slot index information.

9. A user equipment (UE) for receiving a downlink (DL) signal, the UE comprising:
a receiver configured to receive a specific radio network temporary identifier (RNTI) for DL preemption indication information through a UE-specific radio resource control (RRC) signaling;
after reception of the specific RNTI, a controller configured to monitor a DL control channel for receiving the DL preemption indication information based on the received specific RNTI,
wherein the receiver further configured to receive the DL preemption indication information through a multicast signal,
wherein the specific RNTI received through the UE specific RRC signaling is a newly defined RNTI other than at least a cell-RNTI (C-RNTI),
wherein the DL preemption indication information indicates preempted resource information in a prior slot, which precedes a slot in which the DL preemption indication information is received,
wherein the specific RNTI is received with information related to time and frequency, and
wherein the information related to time and frequency is received for the reception of the DL preemption indication information through the UE-specific RRC signaling.

10. The UE according to claim 9, wherein at least one of a subcarrier spacing and a time-domain scheduling unit of first radio resources allocated for the UE are different from second radio resources allocated for another UE.

11. The UE according to claim 9, wherein the DL preemption indication information is received through a common search space of the DL control channel.

12. The UE according to claim 9, wherein the time and frequency information comprises frequency resource information and slot index information.

* * * * *